(12) United States Patent
Reynolds et al.

(10) Patent No.: US 6,554,994 B1
(45) Date of Patent: Apr. 29, 2003

(54) UPFLOW REACTOR SYSTEM WITH LAYERED CATALYST BED FOR HYDROTREATING HEAVY FEEDSTOCKS

(75) Inventors: Bruce E. Reynolds, Martinez, CA (US); Fred W. Lam, Oakland, CA (US); Julie Chabot, Novato, CA (US); Fernando J. Antezana, Tiburon, CA (US); Robert Bachtel, El Cerrito, CA (US); Kirk R. Gibson, El Cerrito, CA (US); Richard Threlkel, El Cerrito, CA (US); Pak C. Leung, Lafayette, CA (US)

(73) Assignee: Chevron U.S.A. Inc., San Francisco, CA (US)

( * ) Notice: Subject to any disclaimer, the term of this patent is extended or adjusted under 35 U.S.C. 154(b) by 0 days.

(21) Appl. No.: 09/290,448

(22) Filed: Apr. 13, 1999

(51) Int. Cl.⁷ .................. C10G 65/02; C10G 65/04
(52) U.S. Cl. ............ 208/211; 208/210; 208/212; 208/251 H; 208/254 H
(58) Field of Search .................. 208/210, 211, 208/212, 251 H, 254 H

(56) References Cited

U.S. PATENT DOCUMENTS

| | | | | |
|---|---|---|---|---|
| 4,571,326 A | | 2/1986 | Bischoff et al. | 422/207 |
| 4,744,887 A | | 5/1988 | Van Driesen et al. | 208/152 |
| 4,830,736 A | * | 5/1989 | Hung et al. | 208/251 H |
| 4,990,243 A | * | 2/1991 | Winslow et al. | 208/254 H |
| 5,071,805 A | * | 12/1991 | Winslow et al. | 208/216 R |
| 5,076,908 A | | 12/1991 | Strangeland et al. | 208/148 |
| 5,177,047 A | | 1/1993 | Threlkel | 502/200 |
| 5,215,955 A | | 6/1993 | Threlkel | 502/221 |
| 5,439,860 A | | 8/1995 | Habib et al. | 502/66 |
| 5,472,928 A | | 12/1995 | Scheuerman et al. | 502/305 |
| 5,522,983 A | * | 6/1996 | Cash et al. | 208/59 |
| 5,591,325 A | | 1/1997 | Higashi | 208/251 H |
| 5,603,904 A | | 2/1997 | Bachtel et al. | 422/143 |
| 5,779,992 A | * | 7/1998 | Higashi | 422/190 |
| 5,989,411 A | * | 11/1999 | Gupta | 208/212 |

* cited by examiner

Primary Examiner—Walter D. Griffin
(74) Attorney, Agent, or Firm—Penny L. Prater; James W. Ambrosius

(57) ABSTRACT

A reactor system and process for hydrotreating a heavy feedstock contaminated with metals sulfur and carbon residue using an upflow fixed bed reactor with at least two catalyst layers having different hydrogenation activity.

14 Claims, 3 Drawing Sheets

UPFLOW REACTOR SYSTEM WITH LAYERED CATALYST BED FOR HYDROTREATING HEAVY FEEDSTOCKS

FIELD OF THE INVENTION

This invention relates to a reactor system and process for the hydrotreating of a heavy feedstock, particularly a residuum, in order to lower the amount of contaminants, especially metals, carbon residue, and sulfur. An upflow fixed bed reactor is described as containing a layered catalyst bed in which the catalyst in the different layers has different hydrogenation activities designed to selectively distribute the removal of the contaminants across the entire catalyst bed to prevent plugging and to increase the life of the catalyst.

DESCRIPTION OF THE RELATED ART

Hydrotreating is a well known method for removing contaminants and upgrading heavy feedstocks prior to further processing. The term "hydrotreating" will be used in this disclosure to denote a process for removing contaminants, especially metals, carbon residue, nitrogen, and sulfur from heavy feedstocks under supra-atmospheric pressure and at elevated temperatures in the presence of hydrogen and a catalyst. As used herein the term "heavy feedstock" refers to a hydrocarbon high in asphaltenes that is derived from a reduced crude oil, petroleum residuum, tar sands bitumen, shale oil, liquified coal, or reclaimed oil. Heavy feedstocks typically contain contaminants, such as carbon residue, sulfur, and metals, which are known to deactivate the catalysts used to upgrade the heavy feedstocks to more valuable products such as transportation fuels and lubricating oils. Hydrotreating operations also typically remove nitrogen from the heavy feedstocks along with the sulfur. Even the production of lower value products such as fuel oils usually requires that the heavy feedstock undergo some upgrading to remove contaminants, especially sulfur, prior to sale in order to reduce air pollution.

Various designs of hydrotreating reactors have been described in the literature for treating heavy feedstocks. Commercial designs may utilize a moving bed of catalyst, such as described in U.S. Pat. No. 5,076,908, or an ebullating catalyst bed, such as described in U.S. Pat. Nos. 4,571,326 and 4,744,887. Downflow fixed bed hydrotreating reactors are the most widely used commercially. They may be distinguished from moving bed reactors in that fresh catalyst cannot be added to the bed and spent catalyst in the bed cannot be removed during operation. In moving bed reactors the flow of feedstock and hydrogen is preferably upward. The catalyst moves downward and is removed from the bottom of the bed as spent catalyst while fresh catalyst is added at the top of the bed. In an ebullating bed the upward flow of feedstock and hydrogen is sufficient to suspend the catalyst and create random movement of the catalyst particles. During operation the volume of an ebullating bed will expand, usually by at least 20%, as compared to the volume of catalyst in the reactor when there is no flow of hydrogen and feedstock through the bed. By contrast, there is little or no expansion in an upflow fixed bed such as described in this disclosure during operation. In fact, the volume of the catalyst bed may actually decrease slightly during operation due to a settling of the catalyst particles. It should be understood that since the reactor walls are rigid the expansion of the catalyst bed will take place only along the vertical axis of the bed. Thus when referring to bed expansion in this disclosure, the increase in height of the bed or depth of the bed in the reactor is an appropriate measure of bed expansion and is directly related to volume.

Usually, the contaminants are removed by contacting the heavy feedstock with a catalyst in the presence of hydrogen at an elevated pressure and temperature. Typically, the catalyst will be an active catalyst, i.e., a catalyst with hydrogenation activity. Contaminating metals, such as nickel and vanadium, usually will be readily removed under hydrotreating conditions and will plate out on the surface and in the pores of the catalyst. The deposition of metals on the catalyst will result in a rapid loss of hydrogenation activity. However, hydrogenation activity is necessary for the removal of other contaminants, such as carbon residue, nitrogen, and sulfur, from the feedstock.

Catalysts used to carry out the removal of metals, carbon residue, and sulfur from heavy feedstocks, referred to generally as hydrotreating catalysts, typically consist of a porous refractory support, usually of alumina, silica, or silica/alumina, that may be impregnated with a metal or metals, such as for example, Group VIB metals (especially molybdenum and tungsten) and Group VIII metals (especially cobalt and nickel) from the Periodic Table, to enhance their activity. Of primary concern with the present invention are those hydrotreating catalysts having demetallation, desulfurization, denitrification, and carbon residue removal activity.

The pore structure of the hydrotreating catalyst is known to affect the desulfurization, denitrification, and carbon residue removal activity of the catalyst as well as how rapidly the catalyst is deactivated by metal contaminants. In general, catalysts having relatively large pores are preferred for removing metal contaminants. For example, catalysts having macropores, that is, pores having diameters of 1000 Angstrom Units or greater, are taught as useful in removing contaminating metals from heavy feedstocks by U.S. Pat. No. 5,215,955. However, for the removal of sulfur, nitrogen, and carbon residue a smaller pore size is usually advantageous, as for example, a catalyst such as described in U.S. Pat. No. 5,177,074 in which at least 70% of its pore volume consists of pores having a diameter of between 70 and 130 Angstrom Units. Unfortunately, catalysts having a smaller pore size are usually more quickly deactivated by the deposition of metals within the pore structure than are catalysts having a larger pore size. Thus in selecting a suitable catalyst to remove contaminants from a heavy feedstock, it is necessary to balance catalyst life against the need to retain sufficient activity to remove the contaminants, especially carbon residue and sulfur.

In order to gain the advantages of both the lower activity catalysts for removing metals and of the higher activity catalysts needed for desulfurization and carbon residue removal, dual or multiple catalyst systems have been proposed for use in fixed bed reactors. Layered catalyst beds are proposed in U.S. Pat. Nos. 4,990,243 and 5,071,805 in which discrete strata of catalyst are arranged in the catalyst bed to take maximum advantage of the different characteristics of each of the catalysts making up the bed. In a layered catalyst bed the demetallation catalyst will usually make up the upper layer of the fixed bed with the catalyst in the lower layer or layers increasing in hydrogenation and desulfurization activity. The heavy feedstock enters the top of the reactor and first contacts the demetallation catalyst where the metal contaminants are removed. The heavy feedstock with a significant portion of its metal contaminants removed passes down through the fixed bed to contact the hydrogenation and desulfurization catalysts where the sulfur and carbon residue contaminants are removed. Due to the lowered metal values in the feedstock the hydrogenation and desulfurization catalysts will have an increased useful life since there are fewer metals present in the feedstock to deactivate the catalysts. However, a disadvantage of the downflow layered catalyst system is the high pressure drop which is typical across the fixed bed. This problem is further aggravated over time as the metals plate out on the catalyst in the upper layer of the bed increasing the pressure drop and eventually plugging the reactor.

The physical admixture of catalysts with differing activity in a fixed reactor bed is proposed in U.S. Pat. No. 5,439,860. This may have the advantage of more evenly distributing the metal contaminants throughout the length of the bed to reduce plugging, but it does not entirely solve the problem of deactivation of the hydrogenation catalysts by the metal contaminants. Much of the desired hydrogenation and desulfurization activity of the catalyst present in the upper portion of the fixed bed will be lost as the metal values plate out on the mixture of catalysts.

The use of a separate guard reactor containing primarily demetallation catalyst followed by a hydrotreating reactor containing the desulfurization catalysts is a known method of dealing with the problem of metals removal. See, for example, U.S. Pat. No. 5,779,992. This approach allows the relatively inexpensive demetallation catalyst in the guard reactor to be changed periodically as the metal contaminants build up in the guard reactor and increase the pressure drop. The more active and expensive hydrogenation catalysts in the hydrotreating reactor are protected from the metal contaminants and will last longer. However, such a system requires a significantly higher initial capital investment, since at least two reactors instead of one are necessary. In addition, in order to prevent the shutdown of the desulfurization reactor during catalyst changeout of the guard reactor, a swing guard reactor must be included in the scheme which results in an even greater upfront capital expenditure.

The use of a downward moving packed catalyst bed with an upflow reactor has been proposed in U.S. Pat. No. 5,076,908. This system has the advantage of being able to continuously add fresh catalyst to the top of the moving bed while the spent catalyst is withdrawn from the bottom of the reactor. In addition, since the feedstock enters the bed from the bottom of the reactor there is very low pressure drop across the catalyst bed as compared to the other systems, and the problem associated with plugging is virtually eliminated. The primary disadvantage of this system is the relatively high capital cost of the reactor and of the associated equipment needed for the addition and removal of catalyst.

Although fixed bed upflow reactors appear in the literature (see U.S. Pat. No. 5,522,983), the use of upflow fixed bed reactors for hydrotreating operations has not been practiced commercially because of the difficulty of designing and managing such a system. The closest practical experience to an upflow fixed bed reactor in a hydrotreating operation is that obtained using the moving bed reactor discussed above when the catalyst in the reactor is withdrawn intermittently as opposed to continuously. In this instance, the reactor is operated for a given period of time as if it were an upflow fixed bed reactor. However, the design of the moving bed reactor is not optimal for this type of operation and does not take full advantage of the fixed bed system. In addition, the moving bed reactor is not well designed for use with a layered catalyst bed system since the integrity of the different catalyst layers will be lost with the addition of fresh catalyst and the removal of spent catalyst unless additional ports are added to the reactor to add and withdraw catalyst from each of the catalyst layers. Since the capital cost of the high pressure ports in the reactor is high, the overall capital cost of such a system would be increased significantly. In addition, the operation of such a system would be complex and somewhat tedious when compared to other schemes.

The present invention combines the most advantageous features of each of the systems discussed above while minimizing the upfront capital expenditure for equipment. The present invention is particularly advantageous for retrofitting an existing reactor or for increasing the reactor volume where pressure drop is a constraint.

SUMMARY OF THE INVENTION

In its broadest aspect, the present invention is directed to a reactor system for treating a heavy feedstock which contains contaminants comprised of a least one metal and of sulfur and carbon residue to produce a product having a lowered amount of said contaminant or contaminants as compared to the heavy feedstock, the reactor system comprising (a) a vertical fixed catalyst bed having a top and bottom and at least a lower horizontal catalyst layer and an upper horizontal catalyst layer, wherein the catalyst in the lower horizontal catalyst layer is characterized as having lower hydrogenation activity than the catalyst in the upper horizontal catalyst layer; (b) fluid distributing means at the bottom of each catalyst layer for controlling and evenly distributing the flow of fluids through the catalyst layer; and (c) means for introducing a fluid comprising the heavy feedstock and hydrogen into the bottom of the fixed bed and withdrawing a product from the top of the fixed bed, whereby the fluid is introduced into the bottom of the fixed catalyst bed and flows generally upward through the fixed bed sequentially contacting first the catalyst in the lower horizontal catalyst layer and then contacting the catalyst in the upper horizontal catalyst layer at a sufficiently low flow rate so that the average expansion of the fixed bed does not exceed five percent.

Broadly, the present invention is also directed to a process for reducing metals, carbon residue, and sulfur contaminants in a heavy feedstock comprising the steps of (a) passing the heavy feedstock in the presence of hydrogen generally upwardly into a single reactor containing therein a vertical fixed bed having at least a lower horizontal catalyst layer and an upper horizontal catalyst layer, wherein the catalyst in the lower horizontal catalyst layer is characterized by having lower hydrogenation activity than the catalyst in the upper horizontal catalyst layer, (b) distributing the flow of heavy feedstock and hydrogen evenly across each catalyst layer as it passes upward, (c) maintaining a sufficiently low rate of flow for the heavy feedstock and hydrogen that the average expansion of the fixed bed does not exceed five percent, (d) sequentially contacting under hydrotreating conditions the heavy feedstock with the catalyst in the lower horizontal catalyst layer to remove a significant portion of the metals present followed by contacting the feedstock with the catalyst in the upper horizontal layer to remove additional metals and at least a portion of the sulfur and carbon residue, and (e) recovering a heavy feedstock product containing less metals and a lower content of carbon residue and sulfur as compared to the heavy feedstock. Preferably at least 50% of the metals will be removed from the heavy feedstock during the process.

The present invention is especially useful for hydrotreating a residuum, especially a metals containing residuum. A residuum for the purpose of this disclosure refers to a heavy feedstock that is high in asphaltenes and is collected from the bottoms of either an atmospheric distillation unit or a vacuum distillation unit. Atmospheric residuum has a boiling range above about 345 degrees C. (650 degrees F.). Vacuum residuum has a boiling range above about 540 degrees C. (1000 degrees F.) and usually will have a higher viscosity than atmospheric residuum. Vacuum residuum may require additional treatment to lower the viscosity of the feedstock. This may be accomplished by the addition of cutter, i.e. a lower viscosity material often recovered from the fractionator, to act as a diluent. It may also be desirable to carry out some visbreaking in the lower catalyst layer to reduce the viscosity of the feedstock.

As already noted, residuum is usually contaminated with various metals, as well as carbon residue and sulfur, which are preferably removed prior to further processing. In addition to the removal of the metals, carbon residue, and sulfur present in the heavy feedstock, the process and reactor system of the present invention will also remove nitrogen. The present invention is especially useful in the removal of metal contaminants from the feedstock, and is most advantageous when it is used to remove metal from a residuum. Typical metal contaminants that occur in residuum feedstocks include, but are not necessarily limited to, iron, vanadium, nickel, and calcium. The metals may be present as fairly simple compounds of the metals, such as oxides, metal halides, and such, or as more complex molecules, such as organometallic compounds. The contaminating metals are usually readily removed from the feedstock under the conditions present in the reactor of the present invention. Catalysts having low hydrogenation activity and relatively large pore diameters are usually preferred for demetallation.

Hydrogenation activity of a catalyst refers in this disclosure to the ability of the catalyst to remove carbon residue and heteroatoms, especially sulfur and nitrogen, from the hydrocarbon molecules in the feedstock in the presence of hydrogen. Thus low hydrogenation activity refers to a catalyst having relatively little ability to remove carbon residue, sulfur, or nitrogen as compared to a catalyst having higher hydrogenation activity which will more readily remove carbon residue, sulfur, and nitrogen.

Carbon residue, nitrogen, and sulfur are also commonly present as contaminants in the residuum. Although these contaminants may be present as relatively simple molecules, they are usually more tightly held in the hydrocarbon molecules by chemical bonds than the metals. Therefore, a somewhat more active hydrogenation catalyst is usually is required to remove the carbon residue, sulfur, and nitrogen than is necessary for the removal of metals. Catalysts suitable for the removal of carbon residue, nitrogen, and sulfur usually will also readily remove metals, but the catalysts become readily deactivated as the metals coat the surface of the catalyst and fill their pores.

Catalysts described in U.S. Pat. No. 5,472,928, the entire disclosure of which is herein incorporated by reference, are characterized by a narrow particle size distribution. Catalysts of this description are especially useful in the practice of the present invention and may be used to advantage in both the upper and lower catalyst layers of the reactor. Particularly preferred are spherical shaped catalysts having good crush strength, i.e., a crush strength of not less then 5 pounds. Crush strength is important to control the breakage of the catalyst particles.

An important aspect of the present invention is the upflow fixed bed design of the reactor. This differs from the typical downflow fixed bed designs which have been used to hydrotreat heavy feedstocks in the past. Due to the upward flow of fluid in the reactor, the upflow fixed bed differs from downflow fixed beds in that the upflow design has a lower pressure drop and a greater resistance to pressure drop buildup. In addition, since the present invention uses a fixed bed, i.e., one where there is relatively little movement of the catalyst particles, the present design is readily distinguished from ebullating bed designs. As already noted the flow of fluid upward through the catalyst bed is low enough to minimize the expansion of the catalyst bed as compared to the bed volume when no fluid is passing through the bed. The expansion of the catalyst bed should not exceed 5% and preferably will not exceed 2%. Ideally the expansion of the bed will be 0% or even a negative percentage, i.e., the volume of catalyst will decrease during operation. A second critical feature of the present invention is the layering of the catalyst to take maximum advantage of the characteristics of the catalysts making up each layer. The ebullating bed and moving bed designs cannot take advantage of a layered catalyst system since the movement of the catalyst particles will destroy the integrity of the individual layers. The present invention also differs from the moving bed design in that it does not require high pressure equipment for the addition and removal of catalyst. This results in a significant reduction in upfront capital costs. The fixed bed is also easier to manage and operate.

A further element of the invention is the fluid distributing means which is located at the bottom of each of the catalyst layers. The fluid distribution means may take a number of forms, such as, for example, screens, grids, perforated plates, and the like. The fluid distribution means serves two primary functions. It is intended to distribute the fluids passing upwardly through the reactor evenly across the horizontal plane of the catalyst layer. It also serves to insure the break-up of large gas bubbles and the optimal mixing of the fluids. Preferably, it also is designed to serve the secondary functions of supporting the catalyst layer and preventing the mixing of the catalyst particles at the interface between any two adjacent catalyst layers.

The present invention is intended for use with other hydroprocessing operations and is particularly valuable when used prior to one or more conventional hydrotreating units which are designed primarily for the removal of sulfur and carbon residue.

DETAILED DESCRIPTION OF THE INVENTION

Figure 1:
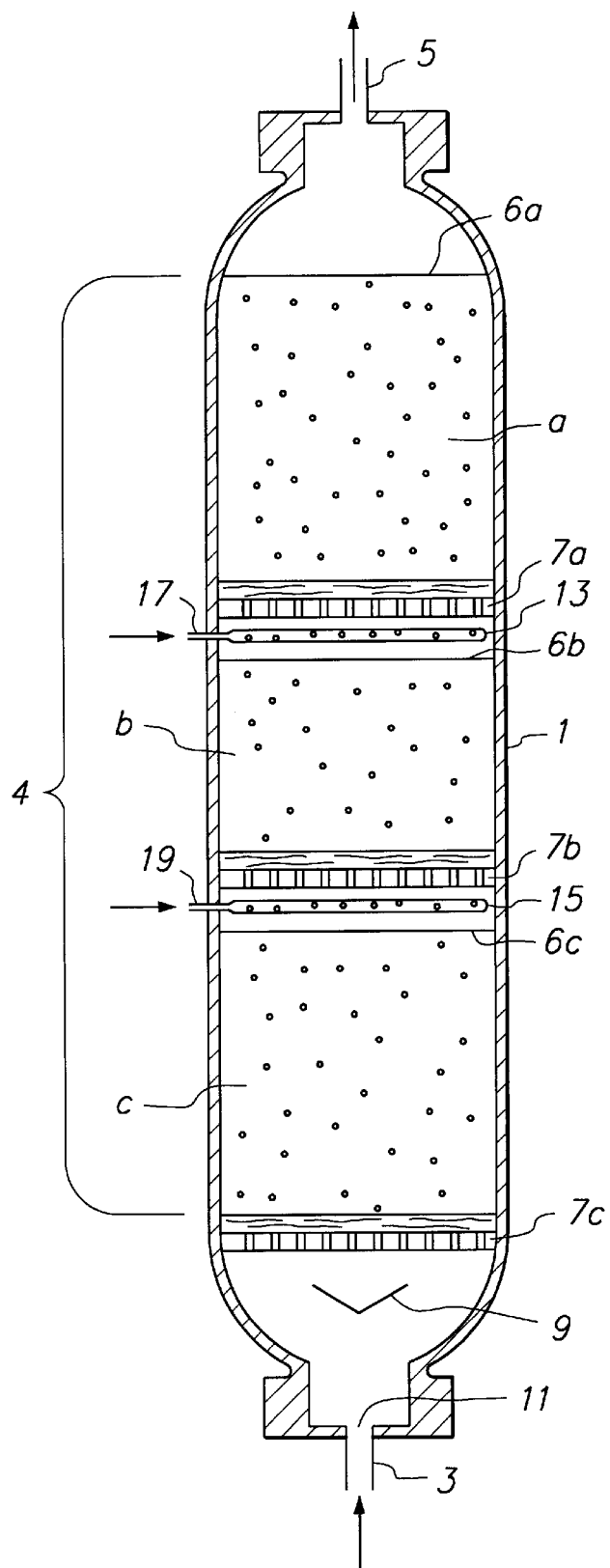
FIG. 1 is a schematic cross sectional view of a reactor for practicing the present invention having three catalyst layers.

The present invention will be readily understood by reference to the drawings. FIG. 1 is a cross sectional schematic view of one embodiment of the invention. A hydrotreating reactor 1 is shown having an inlet pipe 3 for the introduction of a mixture of heavy feedstock and hydrogen and an outlet pipe 5 for the withdrawal of the treated product stream along with any excess hydrogen and quench gases or liquids. The catalyst bed 4 as shown in this particular embodiment is divided into three discrete catalyst layers identified as a, b, and c, respectively; however, one skilled the art will recognize that the number of catalyst layers may be as few as two or as many as is practical for carrying out the intent of the invention. The top of each discrete catalyst layer is identified in the drawing as 6a, 6b, and 6c, respectively. Each of the catalyst layers rests on a catalyst support and fluid distribution means which is identified, respectively, for each of the three catalyst beds as 7a, 7b, and 7c. The catalyst support and fluid distribution means in this embodiment is specifically designed to (a) evenly re-distribute the flow of fluids passing up through the catalyst layers to maximize the opportunity for contact between the fluids and the catalyst particles and (b) to support the catalyst layer and prevent the mixing of the catalyst particles between the adjacent layers of catalyst. The design of the catalyst support and fluid distribution means in this embodiment will be more fully discussed below in association with the description of FIG. 2. A flow deflection cone 9 is located at the bottom of the reactor between the opening 11 of the inlet pipe 3 and the lower catalyst support and fluid distribution means 7c to assist in the distribution of the incoming fluid, consisting of a mixture of feedstock and hydrogen, across the bottom of the lower catalyst support and fluid distribution means. An upper quench header 13 and a lower quench header 15 are located in the spaces immediately above the top of catalyst layers 6b and 6c, respectively, of the two lower catalyst layers and below the catalyst support and fluid distribution means, i.e., 7a and 7b. The quench headers are intended for the introduction of quench fluids by means of quench lines 17 and 19 into the reactor to control the temperature in the bed. The design of this particular embodiment allows the quench to be placed in the most advantageous position to assure the optimal distribution of the quench fluid in the catalyst layer located directly above. Since most hydrotreating reactions produce heat, this design makes it possible to efficiently control the temperature in each of the layers which helps to eliminate hot spots that contribute to the formation of coke.

Figure 2:
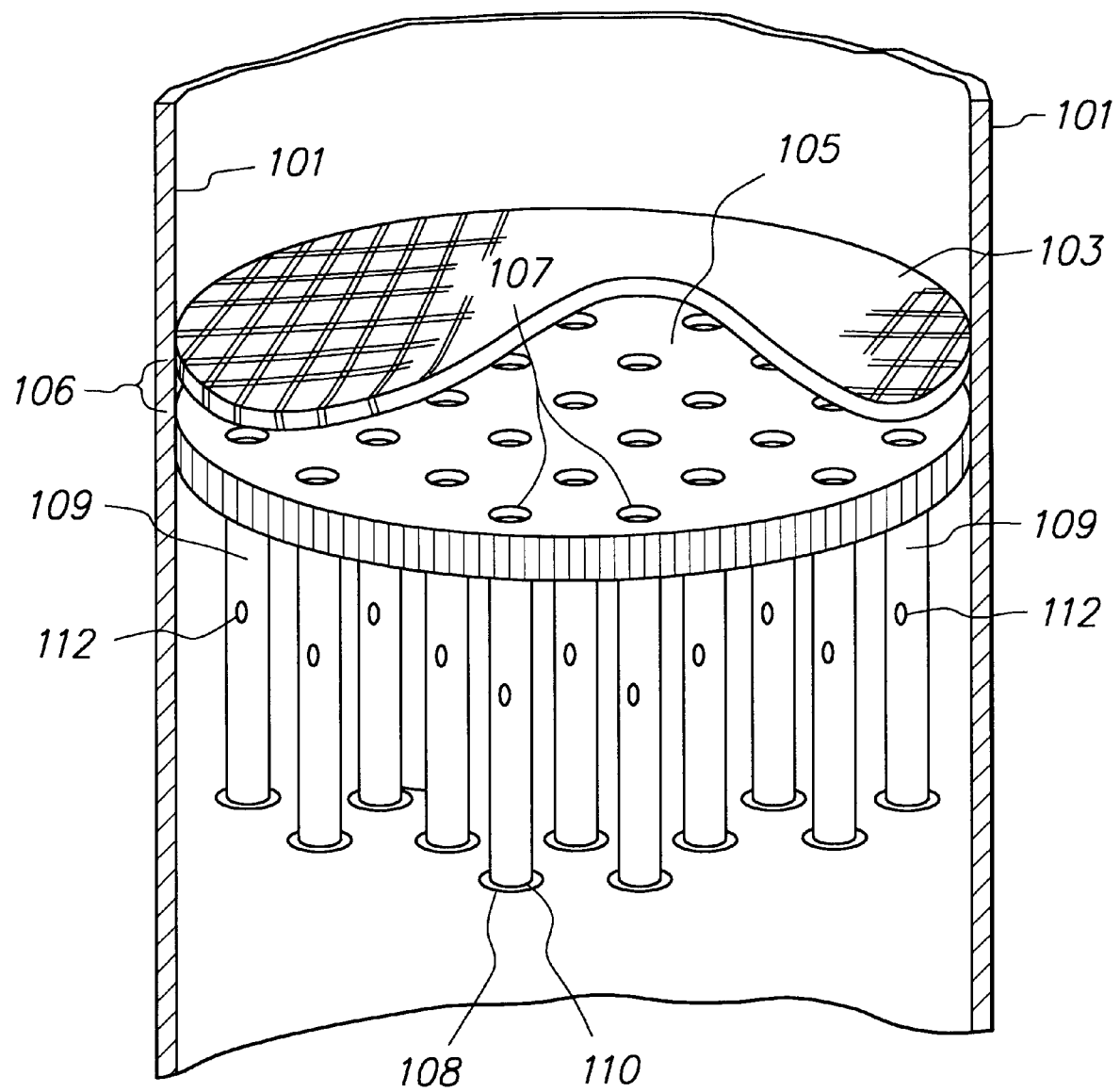
FIG. 2 is a partial perspective sectional view of the reactor of the present invention showing the fluid distribution plate assembly and the catalyst support screen which make up one embodiment of the fluid distribution means.

Referring now to FIG. 2 which illustrates in greater detail one type of catalyst support and fluid distribution means. The catalyst support and fluid distribution means is supported horizontally within the reactor by the reactor walls 101. The device actually comprises two parts, an upper catalyst support grid 103 which is closely associated with a lower gas distribution plate 105. The catalyst support grid may actually rest on the fluid distribution plate, however, in this embodiment there is a narrow space 106 between the two parts. The catalyst support grid is shown in this embodiment as a screen, however, one skilled in the art will recognize that other designs for the grid may also be operable. An important consideration for the catalyst support grid is designing the openings in the grid small enough to prevent the passage of the catalyst particles but sufficiently large and numerous not to impede the upward flow of fluid. The fluid distribution plate 105 is perforated with a plurality of holes 107 which communicate on their underside with the bores of a corresponding plurality of tubes or risers 109 that have a deflector 108 on their lower ends 1 10 to prevent the direct passage of large gas bubbles into the bore of the riser assuring optimal distribution of the fluids. Each riser has at least one opening 112 in its side wall. Vapor passes into the bore of the riser through the openings 112 and the liquid around the deflector and through the opening at the bottom of the risers, up through the perforations 107 in the fluid distribution plate, into the space 106, and upward through the catalyst support grid 103 into the immediately adjacent layer of catalyst. In one embodiment of the invention a protective layer of especially hard or friable resistant catalyst or other material may be placed between the catalyst support grid and the catalyst in the layer immediately above. In another embodiment, a second grid may be placed directly below the fluid distributor to prevent the passage of catalyst particles upward into the risers and plugging of the risers.

During operation the bed of catalyst in the reactor is maintained under hydrotreating conditions. In general, hydrotreating reactions take place within a temperature range of from about 100 degrees C. (212 degrees F.) to about 650 degrees C. (1200 degrees F.), with a range of from about 315 degrees C. (600 degrees F.) to about 480 degrees C. (900 degrees F.) being preferred, and within a pressure range of from about 300 psig to about 4500 psig, with a pressure of from about 1000 psig to about 3500 psig being preferred. In carrying out conventional hydrotreating processes hydrogen is usually present in the reaction zone within the range of from about 3000 to about 5000 standard cubic feet (scf) per barrel of feedstock. In carrying out the present invention while operable at these higher hydrogen amounts, it has been found that the present invention may be carried out with significantly lower amounts of hydrogen. For example, the process of the present invention may be carried out with hydrogen amounts below 2500 scf per barrel and amounts as low as 1800 scf per barrel have been found to be suitable.

Since many of the reactions taking place in the bed of catalyst are exothermic, it is desirable to introduce a quench fluid into the reactor to control the temperature in order to prevent coking that can damage the catalyst and lower the yield of desirable products. As noted above, the present invention makes it possible to place quench lines into the catalyst bed in an optimal location, i.e., directly below the fluid distributing means, to assure the even distribution of quench fluids in each catalyst layer to prevent hot spots. The quench fluid may be either a gas, such as hydrogen, or a liquid, such as recycle material from the fractionation section. Liquid quench is particularly preferred in this system and has the advantage of making it possible to more effectively control the temperature within the bed. A gas quench, while operable, is more generally used with conventional hydrotreating systems.

Hydrogen is present during hydrotreating of the feedstock and will preferably be present in amounts well in excess of the stoichiometric amount necessary to effect the selected hydrogenation reactions taking place in the catalyst bed. Generally the hydrogen will be introduced into the reactor mixed with the heavy feedstock. However, hydrogen may also serve as a quench fluid and, as such, may be at least partially added to the reactor through the quench lines which enter the catalyst bed between the adjacent catalyst layers. However, as noted above, addition of the hydrogen with the quench fluid is not usually preferred with this particular system.

The catalysts that may be used to make up each of the catalyst layers have been described in the literature and are well known in the art. They usually consist of a porous refractory base made up of alumina, silica, phosphorous, or various combinations of these. The catalysts in the lower layers should have good demetallation activity. The catalysts may have hydrogenation and desulfurization activity, but usually it will be advantageous to use large pore size catalysts to maximize the removal of metals. Catalysts having these characteristics are not optimal for the removal of carbon residue and sulfur. The average pore size for catalyst in the lower layer or layers will usually be at least 60 Angstrom units and in many cases will be considerably larger. The catalyst may contain a metal or combination of metals such as nickel, molybdenum, or cobalt. Catalysts useful in the lower layer or layers are described in U.S. Pat. Nos. 5,071,805 and 5,215,955. Those catalysts described in U.S. Pat. No. 5,472,928 characterized by a pore size distribution (PSD) as shown below measured using the nitrogen method have been found to be especially useful in the lower catalyst layer:

| PSD expressed as percent of total pores present | Pores within Range in Angstrom units |
|---|---|
| Min 20% | 130–170 |

The catalysts present in the upper layer or layers of the catalyst bed should have greater hydrogenation activity as compared to catalysts in the lower layer or layers. Consequently catalysts useful in the upper layer or layers will usually be characterized by smaller pore sizes and greater carbon residue removal, denitrification and desulfurization activity. Typically, the catalysts will contain metals such as, for example, nickel, tungsten, and molybdenum to enhance the hydrogenation activity. Those catalysts described in U.S. Pat. No. 5,472,928 characterized by a pore size distribution (PSD) as shown below measured using the nitrogen method have been found to be especially useful in the upper catalyst layers:

| PSD expressed as percent of total pores present | Pore diameter within range in Angstrom units |
|---|---|
| Min 30% | 95–135 |

The catalysts used in carrying out the present invention may be shaped catalysts, but spherical catalysts are generally preferred. In addition, dense, less friable catalysts are usually preferred in the upflow fixed catalyst bed of the present invention to minimize breakage of the catalyst particles and the entrainment of particulates in the product recovered from the reactor.

One skilled in the art will recognize that the various catalyst layers may not be made up of only a single catalyst, but may be composed of an intermixture of different catalysts to achieve the optimal level of metals or carbon residue removal and desulfurization for that layer. Although some hydrogenation will occur in the lower portion of the bed, the present invention contemplates that the removal of carbon residue, nitrogen, and sulfur will take place primarily in the upper layer or layers. Obviously additional metals removal also will take place. The specific catalyst or catalyst mixture selected for each layer, the number of layers in the bed, the proportional volume in the bed of each layer, and the specific hydrotreating conditions selected will depend on the feedstock being processed by the unit, the desired product to be recovered, as well as commercial considerations such as cost of the catalyst. All of these parameters are within the skill of a person engaged in the petroleum processing industry and should not need further elaboration here.

In order to facilitate the flow of feedstock upward through the catalyst layers, it may be desirable to lower the viscosity of the feedstock entering the bottom of the reactor. This is especially the case when vacuum resid is being processed. Preferably the viscosity of the feedstock will be no more than about 400 cst measured at 100 degrees C. To reduce the viscosity a cutter may be used that consists of either a recycle stream or a distillate fraction from the fractionator. Typically with a vacuum residuum the cutter may make up about 20% by volume of the feedstock entering the reactor. In addition, the catalyst and temperature in the lowest layer may be pre-selected to also perform visbreaking operations in order to assist in lowering the viscosity. Visbreaking involves reactions which convert some of the high viscosity components in the feed to lower viscosity materials. Visbreaking will usually involve the limited cracking of some of the highly reactive molecules in the feedstock.

Figure 3:
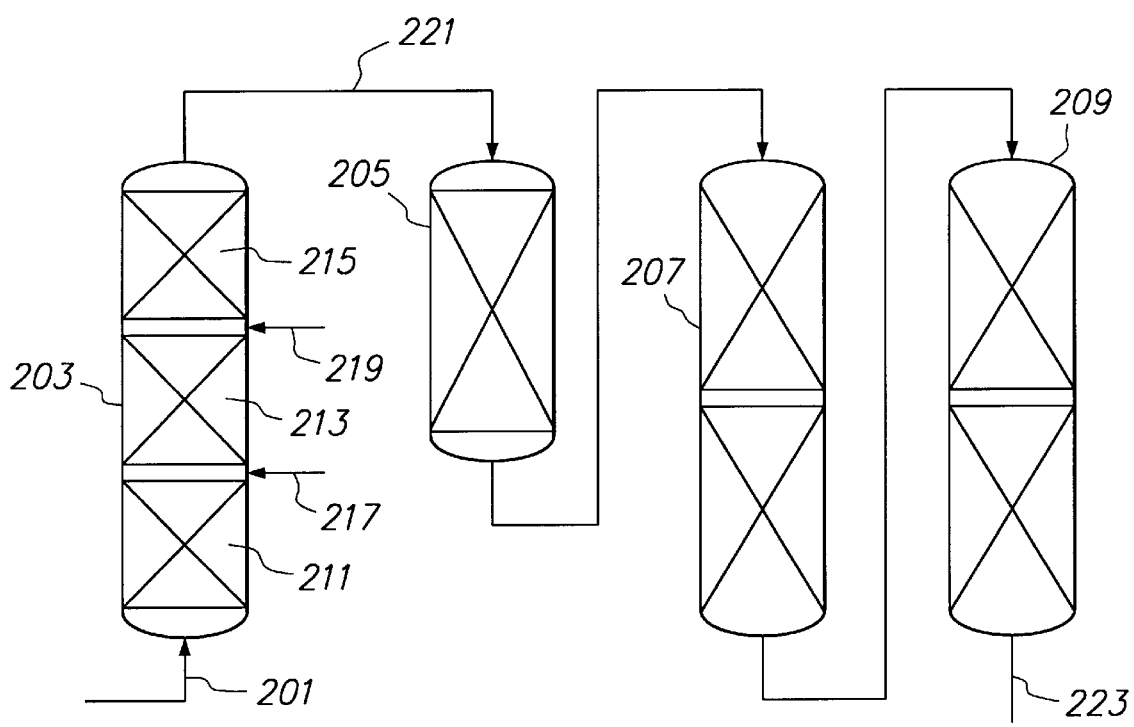
FIG. 3 is a schematic representation of a processing scheme for hydrotreating a vacuum residuum using the present invention in association with conventional hydrotreating units.

The present invention has been found to be particularly advantageous when it is utilized in association with one or more conventional hydrotreating units. For example, in processing vacuum residuum, it has been found that the upflow fixed bed reactor of the present invention is particularly effective in removing metals from the feedstock, and when used in association with conventional down flow hydrotreating units designed primarily for the removal of the sulfur and carbon residue, a product is obtained that is suitable for further processing into higher quality products. FIG. 3 illustrates a processing scheme using the present invention to treat a high viscosity vacuum residuum feedstock having a high metals content in association with sulfur. Nitrogen, if present in the feedstock, will also be removed along with the sulfur. The scheme illustrated consists of a single fixed bed upflow reactor 203 of the present invention associated with three conventional hydrotreating reactors 205, 207, and 209, respectively. The fixed bed upflow reactor 203 is substantially the same as the reactor design shown in FIG. 1 and as discussed in detail above. Feedstock conduit 201 carries a mixture of vacuum residuum, vacuum gas oil, and hydrogen to the bottom of the upflow fixed bed reactor 203. The vacuum gas oil present in the feedstock is recycled material that serves as cutter to lower the viscosity of the vacuum residuum to acceptable levels. The hydrogen in this particular embodiment is present in the feedstock at about 1800 scf per barrel. The catalyst in the three catalyst layers in upflow reactor 203 has been pre-selected to remove at least 60% of the metals from the feedstock. The lower catalyst layer 211 having very low hydrogenation activity is intended to remove the most easily recovered metals. Catalyst having visbreaking activity may also be present in this lower layer. The second and third catalyst layers 213 and 215, respectively, have greater hydrogenation activity and have been preselected to remove much of the remaining metal values. Some desulfurization and carbon residue removal will also occur in the two upper catalyst layers. Quench lines 217 and 219 carry recycled liquid from the fractionator (not shown) to act as a liquid quench. The feed after having much of its metals removed is recovered in line 221 from the top of the upflow reactor. Line 221 carries the feed to the top of conventional hydrotreating reactor 205 where further carbon residue removal and desulfurization take place. The feed is further processed in sequence by conventional hydrotreating reactors 207 and 209. A hydrotreated product with lowered metals, sulfur, nitrogen, and carbon residue is recovered from the bottom of reactor 209 by conduit 223. The hydrotreated product may be used as feedstock in other hydroprocessing operations, such as hydrocracking or FCC operations, to prepare transportation fuels and lubricating base oils.

What is claimed is:

1. A process for reducing metals, carbon residue, and sulfur contaminants in a heavy feedstock comprising the steps of:

a) passing the heavy feedstock in the presence of hydrogen generally upwardly into a single reactor containing therein a vertical fixed bed having at least a lower horizontal catalyst layer and an upper horizontal catalyst layer, wherein the catalyst in the lower horizontal catalyst layer is characterized by having lower hydrogenation activity than the catalyst in the upper horizontal catalyst layer;

b) distributing the heavy feedstock and hydrogen evenly across each catalyst layer as it passes upward;

c) maintaining a sufficiently low rate of flow for the heavy feedstock and hydrogen that the average expansion of the fixed bed does not exceed five percent;

d) sequentially contacting under hydrotreating conditions the heavy feedstock with the catalyst in the lower horizontal catalyst layer to remove a significant portion of the metals present followed by contacting the feedstock with the catalyst in the upper horizontal layer to remove a significant portion of the remaining metals and at least a portion of the sulfur and carbon residue; and e) recovering a heavy feedstock product having less metals and a lower content of carbon residue and sulfur as compared to the heavy feedstock.

2. The process of claim 1 wherein flow rate is sufficiently low that the bed expansion does not exceed two percent.

3. The process of claim 1 wherein the heavy feedstock is a residuum.

4. The process of claim 3 including the additional step of hydrotreating the heavy feedstock product in a separate hydrotreating zone to remove substantially all of the remaining sulfur and metal contaminants from said heavy feedstock product.

5. The process of claim 4 wherein contacting of the residuum with the catalyst in the horizontal catalyst layers takes place at a temperature within the range of from about 315 degrees C. to about 480 degrees C., at a pressure within the range of from about 1000 to about 3500 psig and a hydrogen ratio below about 2500 scf per barrel of residuum feedstock.

6. The process of claim 5 wherein the amount of metals in the heavy feedstock product is reduced by at least 50%.

7. A process for reducing the metal, carbon residue, and sulfur contaminants in a residuum feedstock comprising the steps of:

a) passing the residuum feedstock in the presence of hydrogen generally upwardly into a single reactor containing therein a vertical fixed bed comprised of spherical shaped catalyst particles having at least a lower horizontal catalyst layer and an upper horizontal catalyst layer, wherein the catalyst in the lower horizontal catalyst layer is characterized as having at least 20% of the pores of the catalyst with a diameter within the range of about 130 and about 170 Angstrom units and the catalyst in the upper horizontal catalyst layer is characterized as having at least 30% of the pores of the catalyst with a diameter within the range of about 95 and about 135 Angstrom units;

b) distributing the residuum feedstock and hydrogen evenly throughout each catalyst layer as it passes upward;

c) maintaining a sufficiently low rate of flow rate for the residuum feedstock and hydrogen that the average expansion of the fixed bed does not exceed five percent;

d) sequentially contacting under hydrotreating conditions the residuum feedstock with the catalyst in the lower horizontal catalyst layer to remove a significant portion of the metals present followed by contacting the residuum feedstock with the catalyst in the upper horizontal layer to remove an additional amount of the remaining metals and at least a portion of the sulfur and carbon residue, and e) recovering a residuum product having a lower content of metals, carbon residue, and sulfur as compared to the vacuum residuum feedstock.

8. The process of claim 7 wherein flow rate is sufficiently low that the bed expansion does not exceed two percent.

9. The process of claim 8 wherein the flow rate is sufficiently low that the bed expansion is nil.

10. The process of claim 7 wherein the residuum feedstock is a vacuum residuum feedstock.

11. A The process of claim 10 including a preliminary step prior to step a of lowering the viscosity of the vacuum residuum to about 400 cst when measured at 100 degrees C.

12. The process of claim 11 wherein the lowering of the viscosity of the vacuum residuum is accomplished in the lower horizontal catalyst layer by having a pre-selected catalyst in said layer having sufficient visbreaking activity to lower the viscosity of the residuum feedstock.

13. The process of claim 7 wherein the residuum feedstock is an atmospheric residuum feedstock.

14. The process of claim 7 wherein the amount of metals in the residuum product is reduced by at least 50%.

* * * * *